（12) United States Patent
Andersson

(10) Patent No.: US 7,786,734 B2
(45) Date of Patent: Aug. 31, 2010

(54) METHOD AND DEVICE FOR REGENERATING BATTERIES

(75) Inventor: Bjorn Andersson, Arvika (SE)

(73) Assignee: Bengt Arrestad Fastighets Aktiebolag, Karlstad (SE)

( * ) Notice: Subject to any disclaimer, the term of this patent is extended or adjusted under 35 U.S.C. 154(b) by 660 days.

(21) Appl. No.: 11/577,105

(22) PCT Filed: Oct. 4, 2005

(86) PCT No.: PCT/SE2005/001459

§ 371 (c)(1),
(2), (4) Date: Jul. 9, 2007

(87) PCT Pub. No.: WO2006/041378

PCT Pub. Date: Apr. 20, 2006

(65) Prior Publication Data

US 2009/0029192 A1    Jan. 29, 2009

(30) Foreign Application Priority Data

Oct. 12, 2004    (TR) .......................... A 2004 02657

(51) Int. Cl.
*G01N 27/416* (2006.01)
(52) U.S. Cl. .................. 324/433; 320/130; 320/139; 320/147; 320/133; 320/144; 324/435
(58) Field of Classification Search ................. 324/433, 324/435
See application file for complete search history.

(56) References Cited

U.S. PATENT DOCUMENTS

| 4,097,803 | A | * | 6/1978 | Feldman .................... 324/432 |
| 5,701,069 | A | * | 12/1997 | Wihk .......................... 320/130 |
| 5,798,702 | A | * | 8/1998 | Okamoto et al. ......... 340/636.1 |
| 6,193,765 | B1 | * | 2/2001 | Nakanishi et al. .......... 29/623.1 |
| 6,437,542 | B1 | * | 8/2002 | Liaw et al. ................. 320/147 |
| 2003/0038612 | A1 | | 2/2003 | Kutkut |
| 2008/0122406 | A1 | * | 5/2008 | Lafontaine ................. 320/166 |

FOREIGN PATENT DOCUMENTS

| SU | 528047 A3 | 9/1976 |
| SU | 528047 A3 | 8/1977 |

(Continued)

OTHER PUBLICATIONS

Vaylov, A.M., Control Automation and Battery Servicing, Svyaz, p. 118-119, 1975, Moscow.

(Continued)

*Primary Examiner*—Edward Tso
*Assistant Examiner*—Arun Williams
(74) *Attorney, Agent, or Firm*—Jeffrey S. Melcher; Manelli Denison & Selter PLLC

(57) ABSTRACT

Method for treatment, in the form of regeneration, of an accumulator (160) having at least one cell, preferably lead batteries, in which a varying direct current from a power source (130) is applied in intermittent current supply periods, which are interrupted by pauses of substantially less current, preferably current free, the direct current being sufficient to generate gas in the accumulator. During the treatment process, process data is registered, which process data is used in order to control the treatment process.

41 Claims, 1 Drawing Sheet

FOREIGN PATENT DOCUMENTS

| | | |
|---|---|---|
| SU | 658656 A1 | 4/1979 |
| SU | 974467 A1 | 11/1982 |
| SU | 997145 | 2/1983 |
| SU | 1283896 A1 | 1/1987 |
| SU | 1741227 A1 | 6/1992 |
| WO | 9428610 A1 | 12/1994 |
| WO | WO 9428610 A | 12/1994 |
| WO | 0077911 A1 | 12/2000 |
| WO | WO 0077911 A1 | 12/2000 |

OTHER PUBLICATIONS

Russian Office Action issued in corresponding patent application on Jun. 2, 2009.

Bilaga till svensk patenttidning nr 1999/29, Ans nr 97047270-3, Sokande: Ake Joansson, Ombud: Kransell & Wennborg AB, Off. Dat: 199-06-18. See p. 3.

Russian Office Action issued Dec. 3, 2009 in corresponding patent application.

English Language Translations of Extracts from Russian Patents cited in Russian Office Action, SU658,656 (Apr. 27, 1979) SU1,283,896 (Jan. 15, 1987); SU1,741,227(Jun. 15, 1992).

Russian Examination report for corresponding Russian application on Apr. 22, 2010.

\* cited by examiner

METHOD AND DEVICE FOR REGENERATING BATTERIES

This application is a national stage entry filed under 35 U.S.C.371 of PCT/SE2005/001459 filed 4 Oct. 2005. This application also claims foreign priority under 35 U.S.C.119 and 365 from Turkish patent application No. 2004/02657 filed 12 Oct. 2004.

TECHNICAL FIELD

The present invention relates to a method and device for regeneration of accumulators having at least one cell, preferably lead batteries. A varying direct current from a charging unit is applied in intermittent current supply periods, which are interrupted by pauses of substantially less current, preferably current free pauses. The direct current is sufficient to generate gas in the accumulator.

THE TECHNICAL STANDPOINT

In a charged lead accumulator, i.e. a lead battery, the active substance in the positive electrodes consists of lead superoxide, $PbO_2$, and of porous metallic lead in the negative electrodes. When the battery is discharged, these active substances are converted to lead sulphate, $PbSO_4$ and sulphate ions are taken from the electrolyte, which includes sulphuric acid. In principle, the process is reversed during charging. Conventionally, when being recharged by a continuous direct current, lead accumulators have a limited ability to be recharged. The reason for this is not completely investigated, but it is believed that influence is made by factors such as the products of discharge having a limited solubility in the electrolyte, or that diffusion of the divalent lead ions constitutes the limiting factor both at discharging and recharging. Furthermore, lead sulphate is a very poor conductor of electricity. All these circumstances often result in problems in connection with the charging of lead batteries, which risks being destroyed by inactive layers of lead sulphate that hinder the charging or decreases the capacity and eventually makes the battery useless. In addition, there are problems in the form of different densities before and after the charging, which leads to the formation of sludge and to a decreased strength.

In WO 94/28610, there is presented a solution to the above problems in connection with the charging of accumulators, especially lead batteries. According to this document, lead batteries may thus be charged by high current levels with a very good result and without a noticeable increase in temperature, when a direct current is being applied on the battery in intermittent current supply periods, interrupted by pauses in which no current is supplied. The periods are between about 0.5 seconds and about 10 seconds. However, the technique described in WO 94/28610 is not adapted to all kind of batteries to be recharged, since it is not possible to control the charging process in a sufficiently satisfactory manner.

In WO 00/77911 there is known method for treatment of accumulators having at least one cell, preferably lead batteries, in which a varying direct current from a charging unit is applied in intermittent current supply periods, which are interrupted by current free pauses. The direct current is sufficient to generate gas in the accumulator, wherein said treatment constitutes a regeneration process. The current supply periods have a length of between 0.01 and 0.5 seconds. The current level during the current supply periods amounting to between 80 and 1000 A. The pauses have a length of 1-20 seconds. Process data for at least one cell in the accumulator is registered during the treatment process. The process data is used in order to control the treatment process. The method described in this application eliminates the major problems mentioned above, but still suffers from some drawbacks.

SHORT DESCRIPTION OF THE INVENTION

One object of the present invention is to offer a method for treatment, in the form of regeneration, of accumulators. The treatment process is controlled, in terms of current supply period, pauses and current strength, based on input data. This is achieved by the following steps:

a) measuring the available capacity of the accumulator to be treated by means of a capacity test, b) adapting the parameters of said treatment in accordance with the result in step a), c) using a first set of starting parameters if said capacity is above 80%, using a second set of parameters if said capacity is below 60% and using a further criteria to chose between said first and second starting parameters if said capacity is between 60%-80%, d) adapting the amount of current during pulse in order to achieve more than 2.5 volt per cell and less than 3 volt per cell, in the peak of the pulse at open circuit voltage, and in between the pulses.

A basic object of the method and device according to the invention, is to achieve a regeneration of batteries which is non destructive to a battery, and converts crystals of "hard lead sulphate" back to active material. The treatment process should moreover be adaptable and controllable for every single battery without causing mechanical damage.

Other objects of the invention will become apparent during description of the preferred embodiment below.

DETAILED DESCRIPTION OF THE INVENTION

Figure 1:
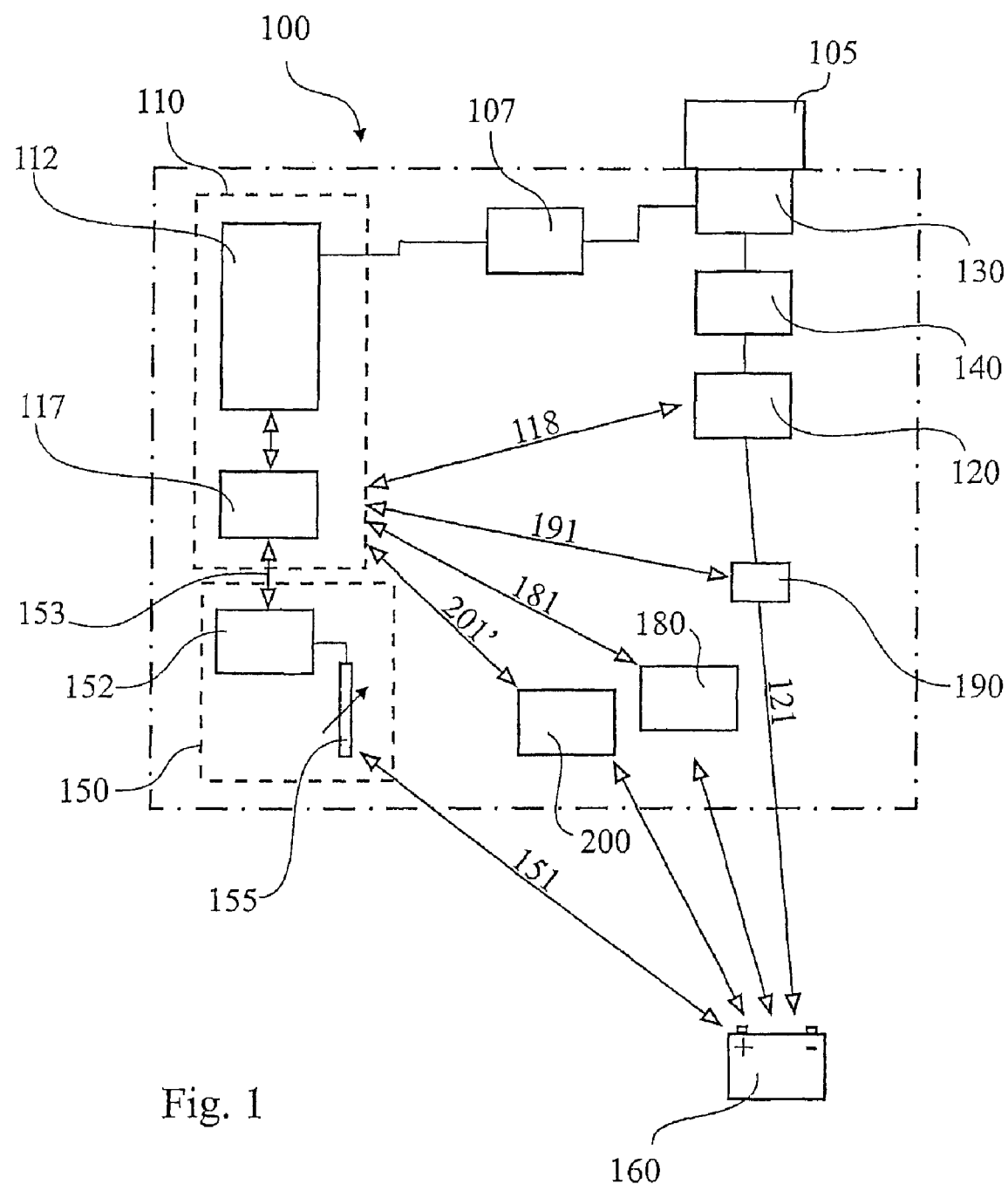
FIG. 1 is a block diagram of a preferred embodiment of the method of regenerating a battery.

In FIG. 1 there is shown a block diagram of a preferred embodiment of a machine 100 according to the invention. The machine 100 preferably comprises a contactor 105, for connecting to a supply of power, to supply a power source 130 within the machine 100. The source 130 in turn feeds the transformer 140, which in turn feeds a number of thyristors 120.

In the preferred embodiment there are three pairs of double-thyristors 120, i.e. in total six thyristors forming two sets. One set includes three thyristors in parallel to control one phase each on the positive side of the sinus curve and one set includes three thyristors in parallel to control one phase each on the negative side of the sinus curve respectively. It is evident for the skilled person that one set would suffice, but in such an embodiment the machine would merely be able to supply half of the power compared to using two sets. As indicated by 121, the thyristors 120 are connected to an accumulator 160 to supply a desired voltage and current to the accumulator.

The thyristors 120 are controlled by a control unit 110. In a preferred embodiment the control unit 110 comprises a PC 112, with conventional equipment, e.g. screen, mouse, hard drive, keyboard, etc., and trigger card device 117. As indicated, the thyristors 120 are controlled by control signals 118 from the trigger card 117. The trigger card 117 is in turn controlled by the PC 112. Sometimes the PC may control an intermediate control card which in turn controls the trigger card 117. As shown in the FIG. 1, the AC/DC converter 107 supplies the electronics within the control unit 110 with power. Furthermore, there is shown that the machine 100 includes a temperature surveillance unit 200 and a voltage surveillance circuit 180.

The machine 100 preferably includes a capacity testing unit 150, comprising a thyristor 152 and a variable resistor 155.

The control unit 110 controls the thyristors 120 to open and close a feed path 121 for electrical energy, supplied by the power source 130, which in turn preferably is supplied by the common electricity supply network. The desired voltage and current for the process is controlled by the control unit 110 via the trigger card 117, by controlling the phase angle and the opening time when trigging the thyristors 120 in collaboration with the transformer 140. Moreover, the current is rectified by the thyristors 120. Thereafter, the rectified current is supplied to the battery 160, as a treatment by means of a tuned electrical energy, with continuously having feed back 191 for the supplied current from the current transducer 190, feed back 181 for achieved voltage from the voltage surveillance circuit 180, and feed back 201 for temperature from the temperature surveillance unit 200. According to the preferred embodiment, the process is controlled during the whole process time, and adjustments of parameters are automatically set depending on the way battery is responding to the process.

The battery is preferably charged from a discharged state. This discharge of the battery is preferably performed by a discharging unit 150 mounted within the machine 100. By connecting 151, the discharging unit 150 is connected to the battery 160, controlled total discharge of the battery 160 may be achieved. During this process, information 153 is supplied to the control unit 110, to control the actual capacity/condition of the battery that is to be charged.

Thereafter, the battery 160 is connected to the power feed 121 and also to the surveillance devices 180, 200. The control unit 110 is thereafter provided with a number of starting parameters for the process that is adapted to the result of the capacity test.

If, for instance for a 48-V battery (e.g. originally 560 Ah), the capacity test has shown that the remaining capacity/condition of the battery is above 80% of the original/starting capacity, the following starting parameters may be set in the PC 112 in a preferred embodiment: a current supply level of 350 ampere, a current supply period of 180 ms, and a pause of 2 seconds. Thereafter the process is started and the PC 112 controlling the trigger card 117 controls the thyristors 120 to supply the set parameters to the battery. During the process, the surveillance units 180, 190, 200 will continuously feed information to the control unit 110. The current transducer 190 will give feed back 191 to the control unit 110 in connection with each supply period/pulse the exact amount of current within the pulse. In accordance with the invention, the voltage within at least most of the cells of the battery 160 should reach at least 2.5 V during the pulse. If that feedback signal 191 identifies that the voltage in most of the cells of the battery 160 does not reach 2.5 volt, the control unit 110 will change the settings to increase the current level in a subsequent supply period, e.g. by 10 ampere. This control loop will continue until the measured voltage level reaches 2.5 volt, and under the condition that the temperature surveillance unit 200 has not provided input to the control unit 110 that the temperature is above a preset temperature level. If the temperature surveillance device 200 signals that the preset temperature level has been reached, without reaching the desired level of voltage, the control unit 110 will also increase the period of pause between two supply periods, in order not to let the battery reach a critical level of temperature. The control unit 110 also monitors the voltage level within each one of the cells in the battery so that the voltage level does not exceed 3 volt, since otherwise this may cause damages to the battery. Directly after termination of a supply period, the voltage surveillance 180 will give a feedback signal 181 to the control unit 110. Hence, if the feedback signal 181 signals that the threshold level of 3 volts is approaching, the control unit 110 will change the time of the supply period to be shorter, and/or lower the current level for a subsequent supply period. If voltage of the cells rises too high, too fast, the regeneration may be terminated and the discharge unit 150 may be used in order to reduce specific gravity and voltage, before regeneration is continued as usual again.

If instead the capacity test has shown that the remaining capacity/condition of the battery is less than 60%, the following starting parameters may be chosen; a current supply level of 250 ampere, a current supply period of 180 ms, and a pause of 3 seconds.

The process will be preformed in basically exactly the same manner.

However, the treatment process is preferably performed in a number of cycles, e.g. 5-15 cycles, with each cycle including a regeneration part and a charging part, e.g. 6-9 hours regeneration and 1 hour charging. The regeneration part, for a battery 160 where the remaining capacity/condition of the is above 80% (i.e. when using said first set of starting parameters) is set to be longer (e.g. 9 hours) than for a battery 160 where the remaining capacity/condition is less than 60% (e.g. 6 hours). The charging part may be set to be substantially the same independent of the capacity/condition of the battery 160, e.g. 0.5-2 hours. Preferably, the current level during charging is less than half of the current level during regeneration, e.g. 40-70 A. Moreover, a variable current supply during charging, has shown to be beneficial, i.e. to alternate the current level during charging, to randomly change the level, such as every 10:th to 30:th second. For example, the current supply can be varied by starting with 60 A for 20 seconds, then 35 A 20 seconds, then 55 A 20 seconds, then 40 A 20 seconds, etc.

As mentioned above, the regeneration part when using the first set of parameters will be longer compared to using the second set of parameters. In other words, a battery 160 having a good remaining capacity/condition may be regenerated "tougher" than a battery 160 having a poor remaining capacity/condition. This leads to a quicker improvement of a battery 160 having a good remaining capacity/condition, which in turn leads to less cycles being necessary. For instance, for a battery 160 where the remaining capacity/condition of the battery 160 is above 80% 5 cycles (of 9+1 hours) may be sufficient (total of 50 hours), whereas 10 cycles (6+1 hours=total of 70 hours) may be necessary for a battery 160 where the remaining capacity/condition of the battery 160 is less than 60%.

The control unit 110 may register process data, which can be accomplished by means of the temperature and conductivity surveillance 200 and the voltage surveillance circuit 180. The control unit 110 may also make use of general data for the specific battery, for the control, as well as older process data and general data, which may be available to the control unit, for example via a network connection or locally stored data.

The invention is not limited by the above described embodiments, but may be varied within the scope of the claims. As its evident for the skilled person, the different units of the machine 100 may not be stored within one and the same vessels/housing. For instance, as is evident for the skilled person in the art the discharging unit 115 may be a separate unit, as also the control unit 110 and/or the surveillance units 180, 200, to be used separate in a connecting network or as modular units that may or may not be assembled. It is evident to the skilled person that the different connections between different units of the machine 100 may be designed in many different ways, e.g. as is know per se, that digital information signals may be transmitted wireless as or by wire or by optical means. Furthermore, the skilled person realizes that many variations from what have been described in the examples given, may be made without departing from the concept according to the invention, e.g. to use it in relation to one phase current (then merely one thyristor or one double-pair being needed), to use different sets of starting parameters, etc. Moreover, it is evident for the skilled person that the process may be further supplemented by adding a conductivity surveillance unit, which preferably may be integrated within circuit 180. This may be achieved by providing a small current to the battery 160, that gives feed back to the control unit of the actual conductivity of the battery, which in turn may be used to better optimize the treatment. Furthermore, it is foreseen that each cell may be surveyed, not limited to treatment process, by measuring, for example, conductivity, voltage, temperature and specific gravity, e.g. by means of wire less sensor units within each one of the cells. It is evident that such an arrangement would provide for even better surveillance during a treatment according to the invention and also for improved surveillance during use of the battery.

The invention claimed is:

1. Method for treatment of accumulators having at least one cell in which a varying direct current from a power unit is applied in intermittent current supply periods, which are interrupted by pauses of substantially less current, the direct current being sufficient to generate gas in the accumulator, wherein said treatment constitutes a regeneration process, wherein said current supply periods have a length of between 0.01 and 1.5 seconds, a current level during said current supply periods amounting to between 80 and 1000 A, said pauses have a length of 1-20 seconds, and wherein process data, for at least one cell in the accumulator, is registered during the treatment process, which process data is used in order to control the treatment process, in the following steps:
   a) measuring available capacity of the accumulator to be treated by means of a capacity test;
   b) adapting parameters of said treatment in accordance with the result in step a); and
   c) using a first set of starting parameters if said capacity is above 80%, using a second set of parameters if said capacity is below 60% and using a further criteria to chose between said first and second starting parameters if said capacity is between 60%-80%, wherein what is controlled during the treatment process is a length of said current supply periods and a length of said pauses and wherein the length of said current supply periods is between 0.15 and 0.4 seconds and the length of said pauses is between 1-10 seconds.

2. Method according to claim 1, wherein the accumulator is a lead battery.

3. Method according to claim 1, wherein the pauses of substantially less current are current free.

4. Method according to claim 1, wherein the length of said pauses in said first set of starting parameters are shorter than in said second set of starting parameters.

5. Method according to claim 1, wherein the treatment process is performed in a number of cycles, each cycle consisting of a regeneration part of 1-12 hours, wherein said regeneration part when using said first set of starting parameters is longer than when using said second set of starting parameters.

6. Method according to claim 5, wherein the treatment process is performed in 1-30 cycles.

7. Method according to claim 5, wherein each cycle includes a regeneration part and a charge part, which charge part is about 0.5-2 hours.

8. Method according to claim 7, wherein the charge part is about 1 hour.

9. Method according to claim 7, wherein a variable current supply is used during charging.

10. Method according to claim 9, wherein the current level during charging is less than half of the current level during said current supply periods.

11. Method according to claim 1, wherein the length of said current supply periods is 0.25 seconds at most and the length of said pauses is between 1-5 seconds.

12. Method according to claim 1, wherein the current supply periods are shorter than the pauses.

13. Method according to claim 1, wherein a current is applied during the current supply periods, which current is strong enough in order for most of the cells in the accumulator to reach a voltage of at least 2.5 V during the current supply period.

14. Method according to claim 1, wherein a current is applied during the current supply periods, which current is strong enough in order for most of the cells in the accumulator to reach a voltage of at least 2.5 V during the current supply period and less than 3 V per cell.

15. Method according to claims 14, wherein the voltage achieved during a current supply periods is measured immediately after termination of a supply period and if this measurement shows that a voltage of 3 V per cell is reached, a decrease of the current level and/or increase of the pause is performed in a subsequent supply period.

16. Method according to claim 1, wherein said current level during at least some of said current supply periods is 110 A to 1000 A.

17. Method according to claim 1, wherein said current level during at least some of said current supply periods is 250 A to 1000 A.

18. Method according to claim 1, wherein said current level during at least some of said current supply periods is 350 A to 1000 A.

19. Method according to claim 1, wherein at least one thyristor, or equivalent device, is used to control supply of current and voltage in said treatment.

20. Method for treatment of accumulators having at least one cell in which a varying direct current from a power unit is applied in intermittent current supply periods, which are interrupted by pauses of substantially less current, the direct current being sufficient to generate gas in the accumulator, wherein said treatment constitutes a regeneration process, wherein said current supply periods have a length of between 0.01 and 1.5 seconds, a current level during said current supply periods amounting to between 80 and 1000 A, said pauses have a length of 1-20 seconds, and wherein process data, for at least one cell in the accumulator, is registered during the treatment process, which process data is used in order to control the treatment process, in the following steps:
   a) measuring available capacity of the accumulator to be treated by means of a capacity test;
   b) adapting parameters of said treatment in accordance with the result in step a); and c) using a first set of starting parameters if said capacity is above 80%, using a second set of parameters if said capacity is below 60% and using a further criteria to chose between said first and second starting parameters if said capacity is between 60%-80%, wherein a current is applied during the current supply periods, which current is strong enough in order for most of the cells in the accumulator to reach a voltage of at least 2.5 V during the current supply period and less than 3 V per cell.

21. Method according to claim 20, wherein the accumulator is a lead battery.

22. Method according to claim 20, wherein the pauses of substantially less current are current free.

23. Method according to claim 20, wherein the length of said pauses in said first set of starting parameters are shorter than in said second set of starting parameters.

24. Method according to claim 20, wherein the treatment process is performed in a number of cycles, each cycle consisting of a regeneration part of 1-12 hours, wherein said regeneration part when using said first set of starting parameters is longer than when using said second set of starting parameters.

25. Method according to claim 24, wherein the treatment process is performed in 1-30 cycles.

26. Method according to claim 24, wherein each cycle includes a regeneration part and a charge part, which charge part is about 0.5-2 hours.

27. Method according to claim 26, wherein the charge part is about 1 hour.

28. Method according to claim 26, wherein a variable current supply is used during charging.

29. Method according to claim 28, wherein the current level during charging is less than half of the current level during said current supply periods.

30. Method according to claim 20, wherein what is controlled during the treatment process is a length of said current supply periods and a length of said pauses.

31. Method according to claim 30, wherein the length of said current supply periods is between 0.01 and 0.5 seconds and the length of said pauses is between 1-20 seconds.

32. Method according to claim 30, wherein the length of said current supply periods is between 0.15 and 0.4 seconds and the length of said pauses is between 1-10 seconds.

33. Method according to claim 30, wherein the length of said current supply periods is 0.25 seconds at most and the length of said pauses is between 1-5 seconds.

34. Method according to claim 30, wherein the current supply periods are shorter than the pauses.

35. Method according to claims 20, wherein the voltage achieved during a current supply periods is measured immediately after termination of a supply period and if this measurement shows that a voltage of 3 V per cell is reached, a decrease of the current level and/or increase of the pause is performed in a subsequent supply period.

36. Method according to claim 20, wherein said current level during at least some of said current supply periods is 110 A to 1000 A.

37. Method according to claim 20, wherein said current level during at least some of said current supply periods is 250 A to 1000 A.

38. Method according to claim 20, wherein said current level during at least some of said current supply periods is 350 A to 1000 A.

39. Method according to claim 20, wherein at least one thyristor, or equivalent device, is used to control supply of current and voltage in said treatment.

40. Method for treatment of accumulators having at least one cell in which a varying direct current from a power unit is applied in intermittent current supply periods, which are interrupted by pauses of substantially less current, the direct current being sufficient to generate gas in the accumulator, wherein said treatment constitutes a regeneration process, wherein said current supply periods have a length of between 0.01 and 1.5 seconds, a current level during said current supply periods amounting to between 80 and 1000 A, said pauses have a length of 1-20 seconds, and wherein process data, for at least one cell in the accumulator, is registered during the treatment process, which process data is used in order to control the treatment process, in the following steps:
   a) measuring the available capacity of the accumulator to be treated by means of a capacity test;
   b) adapting the parameters of said treatment in accordance with the result in step a); and
   c) using a first set of starting parameters if said capacity is above 80%, using a second set of parameters if said capacity is below 60% and using a further criteria to chose between said first and second starting parameters if said capacity is between 60%-80%, wherein a current is applied during the current supply periods, which current is strong enough in order for most of the cells in the accumulator to reach a voltage of at least 2.5 V during the current supply period and less than 3 V per cell, wherein said current level during at least some of said current supply periods is 350 A to 1000 A.

41. Method for treatment of accumulators having at least one cell in which a varying direct current from a power unit is applied in intermittent current supply periods, which are interrupted by pauses of substantially less current, the direct current being sufficient to generate gas in the accumulator, wherein said treatment constitutes a regeneration process, wherein said current supply periods have a length of between 0.01 and 1.5 seconds, a current level during said current supply periods amounting to between 80 and 1000 A, said pauses have a length of 1-20 seconds, and wherein process data, for at least one cell in the accumulator, is registered during the treatment process, which process data is used in order to control the treatment process, in the following steps:
   a) measuring the available capacity of the accumulator to be treated by means of a capacity test;
   b) adapting the parameters of said treatment in accordance with the result in step a); and
   c) using a first set of starting parameters if said capacity is above 80%, using a second set of parameters if said capacity is below 60% and using a further criteria to chose between said first and second starting parameters if said capacity is between 60%-80%, wherein the treatment process is performed in a number of cycles, each cycle includes a regeneration part of 1-12 hours and a charge part, which charge part of about 0.5-2 hours, wherein said regeneration part when using said first set of starting parameters is longer than when using said second set of starting parameters, a variable current supply is used during charging, and the current level during charging is less than half of the current level during said current supply periods.

* * * * *